(12) United States Patent
Khullar et al.

(10) Patent No.: US 6,871,066 B1
(45) Date of Patent: Mar. 22, 2005

(54) METHOD AND AN APPARATUS FOR ESTIMATING RESIDUAL NOISE IN A SIGNAL AND AN APPARATUS UTILIZING THE METHOD

(75) Inventors: Anders Khullar, Bjärred (SE); Bengt Lindoff, Lund (SE); Niklas Stenström, Helsingborg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 547 days.

(21) Appl. No.: 09/661,677

(22) Filed: Sep. 14, 2000

(30) Foreign Application Priority Data

Sep. 17, 1999 (EP) ............................................. 99610054

(51) Int. Cl.[7] ................................................. H04Q 7/20
(52) U.S. Cl. ....................... 455/423; 455/424; 455/425; 455/67.1; 455/226.1; 375/296; 379/406.08
(58) Field of Search .............................. 455/423–425, 455/226.1–226.3, 67.1, 67.3, 67.6, 570; 379/22.08, 406.08; 375/296

(56) References Cited

U.S. PATENT DOCUMENTS

| | | | | | |
|---|---|---|---|---|---|
| 4,633,411 A | * | 12/1986 | Bliss | ............................ | 702/77 |
| 5,406,588 A | * | 4/1995 | Birchler et al. | .............. | 375/346 |
| 5,506,869 A | * | 4/1996 | Royer | ......................... | 375/224 |
| 5,519,730 A | | 5/1996 | Jasper et al. | ................. | 375/260 |
| 5,715,240 A | * | 2/1998 | Borras et al. | ................ | 370/252 |
| 5,911,124 A | * | 6/1999 | Doran | .......................... | 455/570 |
| 5,918,160 A | * | 6/1999 | Lysejko et al. | ................ | 455/74 |
| 5,953,660 A | * | 9/1999 | Ryde et al. | ................... | 455/423 |
| 6,118,982 A | * | 9/2000 | Ghisler et al. | ............ | 455/67.14 |
| 6,134,220 A | * | 10/2000 | Le Strat et al. | .............. | 370/252 |
| 6,339,698 B1 | * | 1/2002 | Cullen | ....................... | 455/67.11 |
| 6,347,217 B1 | * | 2/2002 | Bengtsson et al. | ......... | 455/67.7 |
| 6,539,214 B1 | * | 3/2003 | Lapaille et al. | ........... | 455/226.3 |

FOREIGN PATENT DOCUMENTS

| WO | WO 94/28623 | 12/1994 |
|---|---|---|
| WO | WO 94/28637 | 12/1994 |
| WO | WO 95/28814 | 10/1995 |

OTHER PUBLICATIONS

Yang, Y., European Search Report, App. No. EP 99 61 0054, Mar. 28, 2000, pp. 1–3.

* cited by examiner

*Primary Examiner*—William Trost
*Assistant Examiner*—Sharad Rampuria
(74) *Attorney, Agent, or Firm*—Jenkens & Gilchrist, P.C.

(57) ABSTRACT

The invention relates to: A method for estimating residual noise in the frequency range (271) of a desired part (240) of a signal to a corresponding apparatus and to a mobile telephone utilizing the method.

The object of the present invention is to generate a measure for the residual noise in a signal.

The problem is solved in that the amplitude of the signal (114) comprising the noise is modified, and the signal (114) is combined with the modified signal (115) to create a noise estimation measure (116).

The invention may e.g. be used in digital radio communications systems to contribute to the monitoring of link quality and therefore to improve payload throughput. One of the advantages of the invention is that an indication of link quality at an early stage in the receiver is provided.

20 Claims, 3 Drawing Sheets

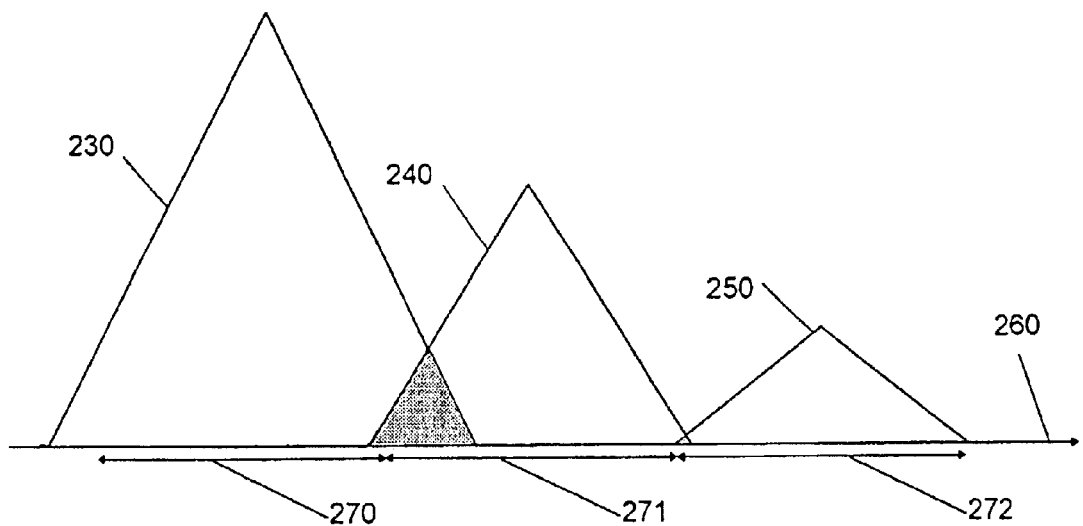
Fig. 2.a
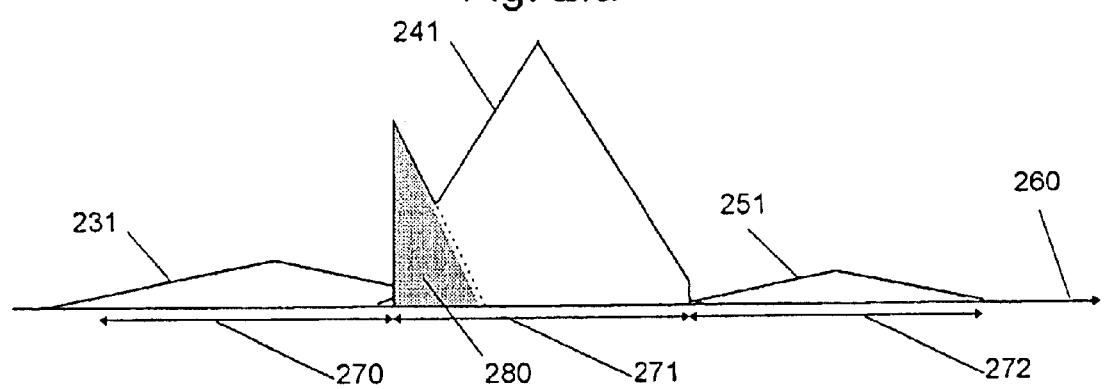
Fig. 2.b
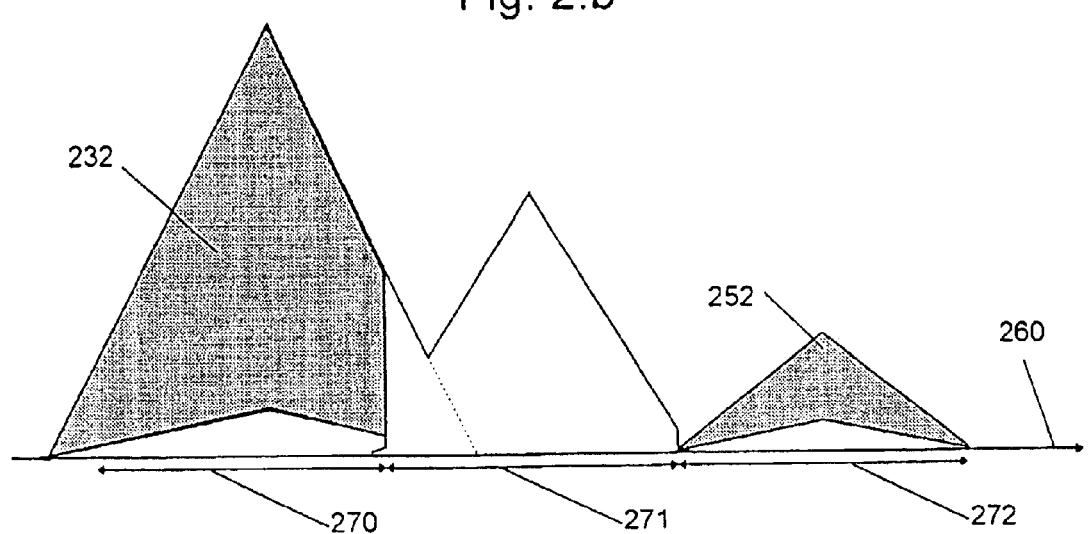
Fig. 2.c

METHOD AND AN APPARATUS FOR ESTIMATING RESIDUAL NOISE IN A SIGNAL AND AN APPARATUS UTILIZING THE METHOD

THE TECHNICAL FIELD OF THE INVENTION

This invention relates to the estimation of residual noise in a signal. The invention may e.g. be applied for the estimation of link quality in a digital radio communications system.

The invention relates specifically to: A method for estimating residual noise in the frequency range of a desired part of a signal.

The invention furthermore relates to: An apparatus for estimating residual noise in the frequency range of a desired part of a signal.

The invention moreover relates to: A mobile telephone utilizing the method.

DESCRIPTION OF RELATED ART

The following account of the prior art relates to one of the areas of application of the present invention, cellular digital radio communications systems.

Technologies for evolving cellular systems from being dominated by voice telephony to systems being capable of handling large amounts of data as well are being developed. One of the requirements of next-generation cellular systems is the ability to provide mobile access to the Internet using World Wide Web (WWW) applications, in other words to facilitate 'high speed' packet oriented data transfer.

One such so-called $3^{rd}$ generation system, is the EDGE system (EDGE=Enhanced Data rates for Global TDMA Evolution, where TDMA Time Division Multiple Access (or alternatively EDGE=Enhanced Data rates for GSM Evolution)). The EDGE system represents a convergence of the US TDMA system called TIA/EIA-136 and the European GSM system making possible the provision of wireless TDMA-based high data rate packet services for mobile users. A standard based on the EDGE concept, termed UWC-136, has been developed/approved by the European Telecommunications Standards Institute (ETSI) and by the Telecommunications Industry Association (TIA) in North America. Other $3^{rd}$ generation systems, based on CDMA (Code Division Multiple Access), are likewise in the development phase: cdma2000 (specified by the (TIA)) and WCDMA (specified by ETSI). Under the name IMT-2000 (IMT=International Mobile Telecommunications) these three systems constitute the technology platforms of the International Telecommunications Union (ITU) for $3^{rd}$ generation mobile communications systems.

On the air interface, GSM (and EDGE) relies on a combination of TDMA and Frequency Division Multiple Access (FDMA) in that a multitude of time slots (8 time slots=1 TDMA frame) is mapped on a multitude of carrier frequencies (for GSM, 125).

In the first generation GSM system a data rate of 9.6 kbit/s based on circuit switching was provided using GMSK channel modulation (GMSK=Gaussian Minimum Shift Keying), each channel having a spacing between carriers of 200 kHz. The General Packet Radio Service (GPRS) for GSM constitutes an intermediate step in the development path towards providing high speed packet mode data transfer for mobile users. GPRS provides peak user data rates between 9 kbit/s and 170 kbit/s by means of time slot concatenation (up to 8) and variable channel coding (4 different). The GPRS protocol and service capabilities are reused in the EDGE system. The EDGE concept improves the data rates, among other things by means of higher level channel modulation and a higher symbol rate. Using 8-PSK modulation (PSK=Phase-Shift Keying), a symbol rate of 3 bits per modulated symbol, and multislot operation, a threefold increase in user bit rate compared to GPRS may be achieved. A data rate of e.g. 384 kbit/s may be achieved with the same 200 kHz carrier spacing and TDMA frame structure and by combining several (up to 8) time slots. The improvement in data rate comes at the cost of a greater sensibility to noise, including disturbances from adjacent channels (adjacent channel interference). The maximum achievable data rate will generally depend on mobile speed and system load.

A digital radio receiver can be regarded as an analogue radio front-end, followed by an AD-converter. A cellular, digital radio system such as GSM or EDGE consists of several frequencies, channels, within the allocated frequency band. For communication, the selected channel needs to be filtered out and it is an advantage to do this in the digital domain. Digital filters are easy to reprogram, inexpensive and do not have filter parameters varying with temperature and voltage.

For a GSM channel using GMSK modulation it is OK to filter hard (i.e. e.g. to use a filter with a slightly narrower bandwidth than the 200 kHz carrier spacing of a GSM channel). This is, however, not the case for a corresponding EDGE channel using 8-PSK modulation and an EDGE receiver will consequently have more problems with adjacent channel interference compared to an ordinary GSM receiver. This type of modulation will also be more sensitive to noise than for example GMSK. Thus: A compromise must be made between the wish to have a broadbanded filter to include all information and the wish to avoid noise from adjacent channels.

Consequently, a system such as EDGE will depend on an LQC system (LQC=Link Quality Control) to optimise system throughput.

The Quality of Service (QoS) of a digital wireless communications system may be largely related to three areas, namely call handling quality, communication quality and coverage quality. The present invention, when used in a cellular communications system, is primarily related to communication quality, i.e. to such effects as radio channel impairment, transmission delay, echo, background noise, etc. For data transmission, the communication quality may be quantified based on bit error rate and transmission delay. For packet oriented data transmission, bit error rate can be kept low by means of retransmission, resulting, however, in increasing delay and decreasing throughput. To optimize channel throughput, it is therefore of great importance to be able to (dynamically) evaluate the channel quality, and, based hereon, to adjust the essential transmission parameters to the quality of the radio channel.

The measurement and reporting of the current link quality are thus most critical tasks that need to be carefully addressed. A report of the presence of a strong interferer would impact the data transmission rate, the amount of error correction overhead, or ultimately result in the choice of a more robust modulation or coding scheme (e.g. from 8-PSK to GMSK channel modulation).

SUMMARY

It is an object of the present invention to generate a measure for the residual noise in a signal.

This is achieved according to the invention in that the amplitude of the signal comprising the noise is modified, and the signal is combined with the modified signal to create a noise estimation measure, as disclosed in claim 1.

In the present context the term 'noise' is taken to mean random noise as well as disturbances from other sources. When referred to the application of the invention in a cellular communications system, the term 'noise' includes disturbances from adjacent channels (adjacent channel interference) or from channels using the same channel frequency as the 'selected' or 'desired' one in another cell (co-channel interference).

The residual noise estimate is based on the assumption that the amount of signal components present in the frequency ranges outside that of the desired frequency range (e.g. that of the selected channel of a cellular communications system) is a measure for the amount of 'noise' present inside the desired frequency range. The usefulness of the resulting noise measure will in general depend on the structure of the signal. For signals representing the potentially overlapping channels of a communications system and the like, where disturbances from 'adjacent channels' are of major concern, the measure is obtained in a simple way and very useful as an indicator of channel quality.

When, as disclosed in claim 2, the noise estimation measure is based on the average power content of the signal and the modified signal over their frequency spectra, it is ensured that a simple measure for comparing the signals based on well known measurement techniques is provided. Alternatively, the noise estimation measure could be based on the gradient of average power (i.e. the changes over time) of the signals in question or on any other appropriate method.

When, as disclosed in claim 3, the noise estimation measure is based on the average power content of the signal and the modified signal over one or more common ranges of their frequency spectra, it is ensured that a simple measure for comparing the signals is provided, and that the measurement may be concentrated to a relevant part of the frequency range, e.g. the frequency range outside the desired part of the signal.

When, as disclosed in claim 4, the signal is attenuated primarily outside the frequency range of the desired part of the signal, it is ensured that the modification of the signal outside the desired frequency range may be performed in a simple way e.g. by using a filter. The attenuation may e.g. be achieved by means of a bandpass filter that passes the desired frequency range (ideally) unchanged and attenuates all other frequencies. Or, alternatively, it may consist of a low-pass filter, ir the desired frequency range is located from a certain frequency and downwards, or of a high-pass filter, if the desired frequency range is located from a certain frequency and upwards. The modification may, however, alternatively take any other appropriate form. It may e.g. consist of an amplification of the signal outside the desired frequency range e.g. by means of one or more frequency selective amplifiers tuned to the relevant frequencies.

When, as disclosed in claim 5, the noise estimation measure is based on the difference in average power content between the signal and the modified signal, it is ensured that a simple method for comparing the signals is provided.

When, as disclosed in claim 6, the signal is a digital signal, it is ensured that the measure and the following processing are more stable over time and against environmental influences, which further promises better performance and lower equipment production costs than corresponding functionality implemented in traditional analogue techniques.

When, as disclosed in claim 7, the signal is attenuated primarily outside the frequency range of the desired part of the signal by means of a digital filter, it is ensured that a cost-effective and flexible solution that is readily adapted to changes is achieved.

When, as disclosed in claim 8, the noise estimation measure is quantized in a number of different levels each indicating different levels of noise present, it is ensured that the measure may be used to quantify the amount of undesired noise in the signal.

When, as disclosed in claim 9, the desired part of the signal represents a selected channel of a digital cellular radio system, and the noise estimation measure or a postprocessed version thereof is communicated to a link quality control system of said digital cellular radio system as an estimator of current link quality, it is ensured that a simple measure for the current link quality is provided and fed back to the transmission system. Other advantages of the present invention are that the implementation is potentially low-cost and that a link quality estimate is provided at an 'early stage' of the signal path, i.e. before the signal is demodulated and further processed in the digital demodulator. This allows a fast response to changing transmission conditions allowing a dynamic adaptation of system throughput to current link quality.

When, as disclosed in claim 10, a noise estimation measurement is performed during each of the basic time units (i.e. time slot or burst) of a channel of the digital cellular radio system, and the result is communicated to a link quality control system of the digital cellular radio system as an estimator of current link quality, it is ensured that the link quality may be continuously monitored and corresponding system actions may be taken instantaneously.

When, as disclosed in claim 11, several noise estimation measurements are performed, the results are stored, and the results are evaluated, and a derived trend is communicated to a link quality control system of a digital cellular radio system as an estimator of current link quality, it is ensured that a trend in the link quality may be derived and reported.

When, as disclosed in claim 12, the noise estimation measure transferred to the link quality control system is used by the digital cellular radio system to optimize user information channel throughput by adjusting the data transmission rate, the error correction depth and/or the type of modulation, it is ensured that an optimal user throughput considering the current link quality may be achieved.

When, as disclosed in claim 13, the noise estimation measure is transferred to the digital demodulator and used to adjust the receiver algorithm, it is ensured that an optimization of receiver processing and thus power consumption may be achieved.

An apparatus for estimating residual noise in the frequency range of a desired part of a signal is furthermore provided by the present invention. When, as disclosed in claim 14, it includes means for modifying the amplitude of the signal comprising the noise, and means for combining the signal with the modified signal to create a noise estimation measure, and means for transferring the measure to a processing unit, it is ensured that a simple measure for the residual noise in a signal is provided.

When, as disclosed in claim 15, the means for combining the signal with the modified signal to create a noise estimation measure comprise a power meter for measuring average power content of the signal and the modified signal over one or more common ranges of their frequency spectra, it is ensured that a simple measure for comparing the signals is provided and that the measurement may be concentrated to a relevant part of the frequency range, e.g. the frequency range outside the desired part of the signal.

When, as disclosed in claim 16, the means for modifying the amplitude of the signal comprising the noise include means for attenuating the signal primarily outside the frequency range of the desired part of the signal, it is ensured that the modification of the signal outside the desired frequency range may be performed in a simple way, e.g. by using a filter.

When, as disclosed in claim 17, the means for combining the signal with the modified signal to create a noise estimation measure comprise means for computing the difference in average power content between the signal and the modified signal, it is ensured that a simple way of providing the noise estimation measure is achieved.

When, as disclosed in claim 18, it is adapted to handle digital signals, it is ensured that the measure and the following processing steps are more stable over time and against environmental influences, which further promises better performance and lower equipment production costs than corresponding functionality implemented in traditional analogue techniques.

When, as disclosed in claim 19, the means for attenuating the signal primarily outside the frequency range of the desired part of the signal comprise a digital filter, it is ensured that a cost-effective and flexible solution that is readily adapted to changes is achieved.

When, as disclosed in claim 20, it includes means for storing consecutive values of the noise estimation measure, and means for processing the values to extract a trend, and means for communicating the individual values or the extracted trend or postprocessed versions hereof to a quality control system, it is ensured that an appropriate postprocessing of the noise estimation measure may be performed readily. The processing means may e.g. include means for quantizing the noise estimation measure in a number of different levels, i.e. to grade a given measurement value on an appropriate scale according to the expected dynamic range of the values.

A mobile telephone is moreover provided by the present invention. When, as disclosed in claim 21, it contains an apparatus, comprising means for performing the steps of claim 1, for estimating residual noise in the frequency range of a desired part of a signal, and means for storing, evaluating and transmitting resulting noise estimation measurements or postprocessed versions thereof to a link quality control system of a cellular radio system, it is ensured that the cellular radio system is provided with a link quality estimate that may be used to optimize the user throughput.

When, as disclosed in claim 20, it is adapted to perform the noise estimation measurement during each of the basic time units (i.e. time slot or burst) of a channel of the digital cellular radio system, it is ensured that the link quality may be monitored continuously and corresponding system actions may be taken instantaneously.

BRIEF DESCRIPTION OF THE DRAWINGS

The invention will be explained more fully below in connection with a preferred embodiment and with reference to the drawings in which:

FIG. 2 shows an idealized sketch of the frequency dependence of the received power of the signal before and after the digital filter.

DETAILED DESCRIPTION OF EMBODIMENTS

Figure 1:
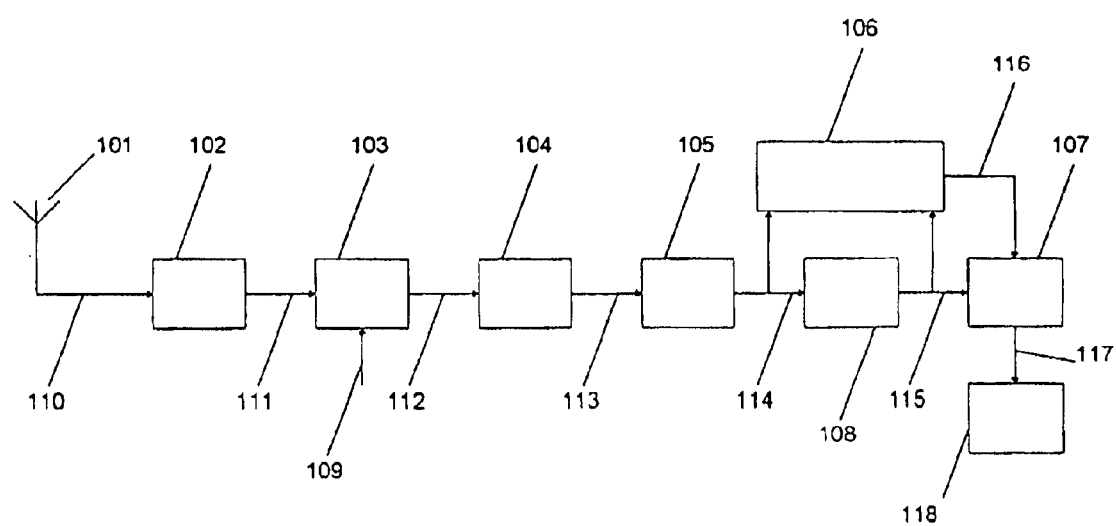
FIG. 1 shows the front-end of a receiver for a mobile telephone of a cellular digital radio communications system according to the invention.

FIG. 1 shows the front-end of a receiver for a mobile telephone of a cellular digital radio communications system according to the invention.

In FIG. 1, 101 denotes the receiver antenna (optionally used together with the transmitter part via a duplexer), and 110 denotes the received radio frequency signal. The received signal 101 is fed to an RX-band filter 102 that filters out the relevant received frequency band, delivering the signal 111 containing the frequency band allocated to the cellular system in question, e.g. the GSM frequency band around 900 MHz or the IMT-2000 frequency band allocated around 1950 MHz. The signal 111 is fed to an analogue demodulator 103 that mixes the relevant part of the frequency band down in the baseband, using a system-given channel frequency 109 for the down-conversion.

The output signal 112 from the analogue demodulator 103 is fed to an analogue filter 104 that filters out the frequencies around the relevant channel, resulting in the signal 113. The signal 113 contains noise and disturbances from adjacent channels. An AD-converter 105 (AD=Analogue to Digital) converts the signal 113 to the digital domain in the form of the signal 114. A digital filter 108 filters out the relevant channel 115 from the input signal 114. Using the digital signals before and after the digital filter 108, i.e. signals 114 and 115 as inputs, the Link Quality Estimator 106 measures the difference in average power content between the two input signals and outputs a signal 116 to the signal processing unit 107. The measure 116 represents an indicator of residual noise in the frequency range of the desired signal 115.

The measure 116 may be further processed by the signal processing unit 107. As a result, a message 117 representing the current link quality (or a trend herein) is forwarded to the transmission part 118 of the mobile unit and transmitted to the Link Quality Control system of the digital radio communications system, i.e. to the base station presently allocated to the mobile telephone.

FIG. 2 shows an idealized sketch of the frequency dependence of the received power of the signal before and after the digital filter. The frequency axis is denoted by 260. Although the relevant signals 114 and 115 of FIG. 1 are digital, a frequency dependence of the power content corresponding to their analogue representations is shown for illustrative purposes.

The input signal to the digital filter 114 of FIG. 1 is schematically depicted in FIG. 2.a. The signal contains noise (not indicated) and signal components 230, 250 from adjacent channels, whose signal power is primarily located in the frequency ranges 270 and 272, in addition to the desired signal components 240 of the selected channel 271, i.e. there is undesired amplitude at frequencies outside as well as inside the frequency range of the desired/selected channel 271. The sketch represents a situation with a strongly disturbing neighbouring signal 230 and a moderately disturbing neighbouring signal 250. The grey shaded areas in FIG. 2.a represent the frequency ranges where an overlap with the adjacent channels is present. After (non-ideal) filtering of the signal 114 of FIG. 1, the resulting signal 115 of FIG. 1 primarily has signal amplitude 241 in the frequency range 271 of the desired signal, as schematically illustrated in FIG. 2.b (where the signal amplitudes outside the range 271 (mainly components 231 and 251) are somewhat exaggerated for illustrative purposes). However, a part of the amplitude of the signal in the desired frequency range 271 originates from noise and/or adjacent channels, as indicated by the shaded area 280. By measuring the average power of signal 115 of FIG. 1 and subtracting it from the average power of signal 114 of FIG. 1 (both taken over the entire frequency range of signal 114) we get a measure for the 'noise' (i.e. undesired signal components) in the desired frequency range 271. This is illustrated in FIG. 2.c, where the sum of the shaded areas 232 and 252 represents the measure.

I.e. we assume that the amount of signal components present in the frequency ranges 270, 272 outside that of the selected channel is a measure for the amount of 'noise' (i.e. primarily undesired signal components from adjacent channels) present inside the frequency range 271 of the selected channel. The usefulness of the resulting noise measure will in general depend on the structure of the signal 114. For signals representing the potentially overlapping channels of a communications system and the like, the measure is certainly very useful.

After filtering, the received signal consists of the signal from the selected channel and additional noise from adjacent channels, not removed by the non-ideal filters (cf. FIG. 2.b). The relation in strength between the selected channel and adjacent channels will determine the amount of residual adjacent channel noise. This relation will influence the receiver performance.

An estimation of the adjacent channel residual noise will therefore also be useful in the following digital signal processing (block 107 of FIG. 1). Receiver algorithms may be tailored to match the interference presence in each single burst.

The measurements of the average power of the signals 114 and 115 of FIG. 1 are performed over the frequency range where the signal 114 has a significant amplitude, i.e. ranges 270, 271 and 272 in FIG. 2. In a special embodiment of the invention, the frequency range of measurement is restricted to that outside the selected channel (i.e. to the ranges 270, 272). This has the advantage of eliminating the attenuation of the filter in the desired frequency range 271 from the measurement.

The output signal 116 of FIG. 1 is quantized in the Link Quality Estimator block 106 and takes on one of a relevant number of levels, e.g. 8, in which the range of the possible results is subdivided. The 'scale' of the levels may be linear or logarithmic dependent on the dynamic range of the measurement results. The interpretation of the measurements is as follows: A relatively large absolute difference in average power content represents a relatively large residual noise and hence a relatively low link quality estimate, whereas a relatively small absolute difference in average power content represents a relatively small residual noise and hence a relatively high link quality estimate. This may be illustrated by FIG. 2.c, where the shaded area 232, taken alone, represents a relatively large absolute difference in average power content corresponding to a relatively large amount of residual noise in the desired frequency range and correspondingly a relatively low link quality. Similarly, the shaded area 252, taken alone, represents a relatively small absolute difference in average power content corresponding to a relatively small amount of residual noise in the desired frequency range and correspondingly a relatively high link quality.

Figure 3:
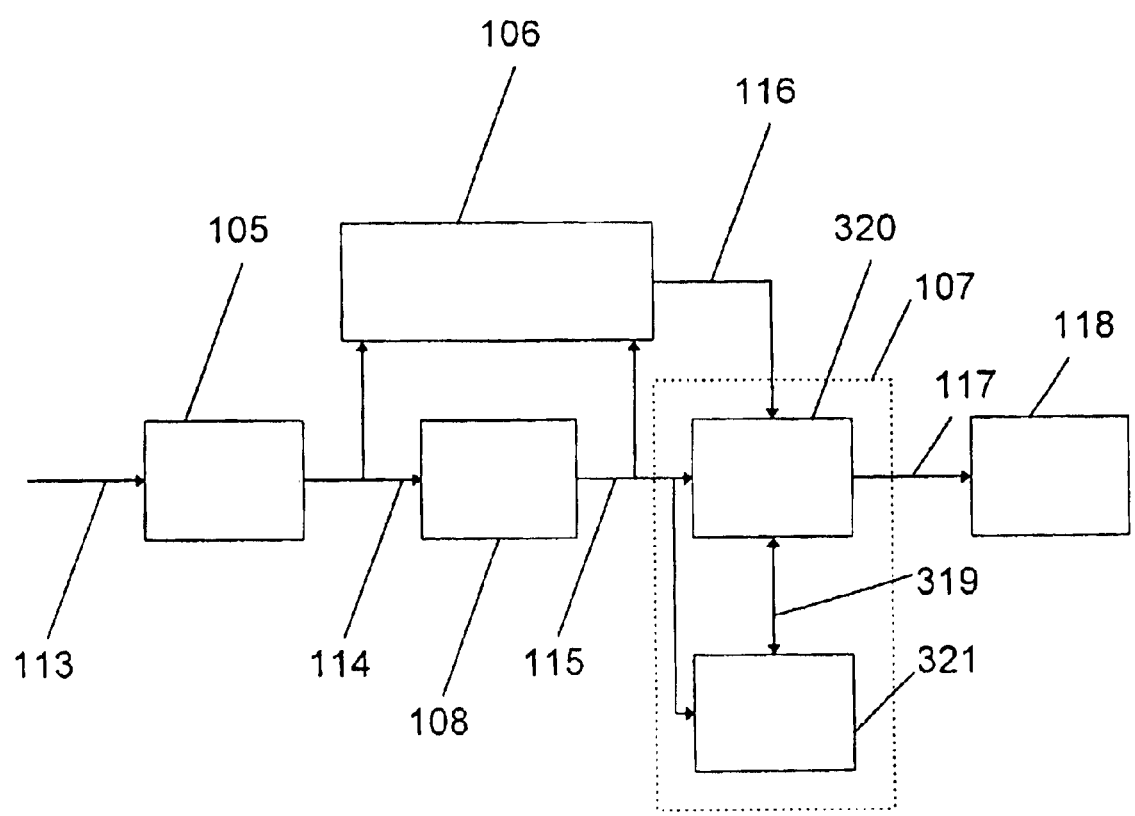
FIG. 3 shows a part of a front-end of a receiver for a mobile telephone of a cellular digital radio communications system according to the invention.

In an alternative embodiment, a part of the evaluation of the difference in average power content between the two input signals 114 and 115 of FIG. 1 to the Link Quality Estimator 106 is performed in the control unit contained in the processing block 107 (cf. 320 in FIG. 3).

FIG. 3 shows a part of a front-end of a receiver for a mobile telephone of a cellular digital radio communications system according to the invention.

In FIG. 3, the signal processing unit 107 is subdivided in control unit 320 and digital demodulator 321 blocks.

The signal 115 from the digital filter 108 is fed to the digital demodulator 321 for further processing and to the control unit 320 for possible evaluation and extraction of further information concerning link quality in addition to that of the noise estimation measure signal 116 from the Link Quality Estimator block 106. The control unit 320 includes a Digital Signal Processor (DSP) and memory (e.g. RAM) for the storage of the most recent noise estimation measures, and for the generation of the link quality estimate 117 that is fed to the transmission part 118 of the mobile telephone for transfer to the Link Quality Control system. In a preferred embodiment of the invention, the functions of the control unit and the digital demodulator are integrated in one functional block (cf. 107 of FIG. 1).

One use of the residual noise measure 116 according to the invention is to adjust the link quality estimate 117 reported and used by the network for optimising system throughput. This use of the invention would e.g. improve the performance of the LQC concept proposed for the EDGE system.

The digital demodulator 321 demodulates the digital signal 115 and extracts the user-specific information and control information. The control unit 320 (e.g. a DSP with internal and possibly extra accessible external memory) evaluates the control information. One part of the control information is extracted from the received signal 115 and possibly transferred from the demodulator 321 via the connection 319, the other is the noise estimation measure 116 transferred from the Link Quality Estimator 106. Based thereon, the control unit 320 performs the relevant actions, e.g. sends a report 117, via the transmit part 118 of the mobile telephone, to the Link Quality Control system concerning the present channel quality or the trend in channel quality. The latter is based on stored values of recent channel quality data. In a preferred embodiment of the invention, the measured noise estimation values are stored and evaluated in the Link Quality Estimator 106. It may alternatively be stored and evaluated in the control unit 320 of the processing unit 107. Based on a number (e.g. 100) of stored values, the trend may be derived by any one of a variety of standard methods, e.g. by simply taking the average value, or by computing the slope of a straight line fitted to the stored measurements (time, value) and evaluating it together with the most recent measurement value, etc.

The link quality estimation data may e.g. be transmitted from the mobile station to its presently allocated base station and hence to the LQC system via one of the logic control channels of the system that carries signalling or synchronization data (as opposed to traffic channels that carry the user speech or data), as symbolized by the signal 117 to the transmit part 118 of the mobile station. In a GSM system, the logic control channels are e.g. termed BCCH (Broadcast Control Channel), CCCH (Common Control Channel), SDCCH (Stand-alone Control Channel), ACCH (Associated Control Channel), the latter having a Slow (SACCH) and Fast (FACCH) version. The SACCH and FACCH may both be used to transfer signalling data, including e.g. a link quality estimate, during a connection.

The basic unit of a logic control channel in the GSM and EDGE systems is 184 bits long. To ensure protection against transmission errors, the 184 control bits are mapped onto a 456 bit block by adding check bits and a channel code to provide error correction possibilities.

The contents of the logical channels are mapped onto and transferred via physical channels. The 456 bit blocks are partitioned in subblocks of 57 bits length, which are interleaved with subblocks of neighbouring 456 bit blocks and mapped onto logical 'bursts' each of 114 bits length. By the addition of extra bits for administrative purposes (tail bits and guard period), the logical bursts are mapped onto the physical bursts each of 156.25 bits length (or 577 µs) for the actual transmission. This is the basic time slot unit for a GSM or EDGE based system onto which all normal and control information is to be mapped.

A physical channel in a TDMA system is defined as a time slot with a time slot number in a sequence of TDMA frames. To protect against fading, frequency hopping may be applied. This means that the physical channel is partitioned in both time and frequency so that each burst is transmitted via a different radio frequency (RF) channel. The physical channel is thus defined as a sequence of RF channels and time slots. Each carrier frequency supports eight physical channels mapped onto eight time slots within a TDMA frame.

Details of the GSM logical traffic and control channels and their mapping onto physical channels are standardized in GSM Recommendation R.05 dealing with the 'Physical layer on the radio path '.

The quality measurements (i.e. the noise detection estimate and its further processing) may be performed in each burst or with a certain frequency, e.g. every TDMA frame (=8 time slots) or every multiframe (=26 TDMA frames in a GSM system), etc. Alternatively, the measurement frequency may be made dependent on the measurement results following a predefined algorithm (e.g. relatively high quality measures being associated with relatively low measurement frequencies, the measurement frequencies being confined to a certain min-max-range). Similar patterns may be employed for the reporting of the measure to the Link Quality Control system. The link quality measure may be reported via one of the signalling channels of the cellular communications system. Referring to the GSM system: If a relatively slow frequency of reporting is needed (e.g. in reporting trends) the SACCH signal may e.g. be used (1 SACCH is sent per multiframe, each consisting of 26 TDMA frames, i.e. every 120 ms). If an 'instant' reporting is needed (e.g. when reporting per burst) the FACCH signal may be used. The FACCH is inserted instead of user data using a so-called 'stealing flag' to distinguish signalling data from user data within a burst.

In a preferred embodiment of the invention, the report of the current link quality estimates or the trend therein to the Link Quality Control system, is used by the system to decide whether to change parameters concerning the link throughput such as data transmission rate, 'error correction depth' and/or type of modulation (e.g. between 8-PSK and GMSK). This decision may be based on other parameters possibly reported by the mobile station as well, e.g. the received level of the channel carrier, the absolute distance between the base and mobile stations, the bit error ratio before channel decoding, etc.

Another use of the information represented by the residual noise measure is to introduce ways to compensate each burst by signal processing. Each burst will have an estimation of the interference. This information may be used for:

Fast adaptation of for example receiver filtering properties.

Input data to noise cancellation algorithms.

In a preferred embodiment of the invention, the measurements are performed in each burst and the results are currently reported to the signal processing unit via the connection 319 in FIG. 3 and used therein to modify the receiver algorithm to improve receiver performance, e.g. by adjusting the amount of 'data processing' (error correction, etc.) controlled by the link quality estimate. This will enable the use of algorithms, designed to optimize performance at different reception conditions. If e.g. the link quality is good, less complex receiver algorithms may be employed and thus power may be saved. The latter is of particular importance in mobile units such as cellular telephones.

Although the invention has been described in relation to a digital cellular radio communications system using TDMA, it may also be used in all other situations where a measure for the residual noise in a signal is needed, e.g. in other communications systems, be it CDMA based systems, frequency hopping or non frequency hopping systems, analogue systems, etc.

What is claimed is:

1. A method for estimating residual noise in a frequency range of a desired part of a signal received in a mobile receiver via a digital cellular radio system, the desired part of the received signal representing a selected channel of the digital cellular radio system, the method comprising:

modifying the amplitude of the received signal, the received signal including the residual noise;

combining the received signal with the modified received signal to create a noise estimation measure; and transmitting, uplink from the mobile receiver and via the digital cellular radio system, the noise estimation measure or a post-processed version of the noise estimation measure to a link quality control system of the digital cellular radio system.

2. The method according to claim 1, wherein the noise estimation measure is based on an average power content of the signal and the modified signal over their frequency spectra.

3. The method according to claim 2, wherein the noise estimation measure is based on the average power content of the signal and the modified signal over one or more common ranges of their frequency spectra.

4. The method according to any one of claims 1 to 3, wherein the signal is attenuated primarily outside a frequency range of the desired part of the signal.

5. The method according to claim 2 or 3, wherein the noise estimation measure is based on a difference in average power content between the signal and the modified signal.

6. The method according to any one of claims 1 to 3, wherein the signal is a digital signal.

7. The method according to claim 4, wherein the signal is attenuated primarily outside the frequency range of the desired part of the signal via a digital filter.

8. The method according to any one of claims 1 to 3, wherein the noise estimation measure is quantized in a number of different levels each indicating different levels of noise present.

9. The method according to claim 1, wherein a noise estimation measurement is performed during each of the basic time units of a channel of the digital cellular radio system, and the result is communicated to the link quality control system of the digital cellular radio system as an estimator of current link quality.

10. The method according to claim 1, wherein several noise estimation measurements are performed, the results are stored, and the results are evaluated, and a derived trend is communicated to the link quality control system of a digital cellular radio system as an estimator of current link quality.

11. The method according to claim 1, wherein the noise estimation measure transferred to the link quality control system is used by the digital cellular radio system to optimize user information channel throughput by adjusting at least one of the data transmission rate, the error correction depth, and a type of modulation.

12. The method according to claim 1, wherein the noise estimation measure is transferred to a digital demodulator and used to adjust a receiver algorithm.

13. An apparatus for estimating residual noise in a frequency range of a desired part of a signal received in a mobile receiver via a digital cellular radio system, the desired part of the received signal representing a selected channel of the digital cellular radio system, the apparatus comprising:

means for modifying an amplitude of the received signal, the received signal comprising the residual noise;

means for combining the received signal with the modified signal to create a noise estimation measure;

means for transferring the noise estimation measure to a processing unit;

means for storing consecutive values of the noise estimation measure;

means for processing the consecutive values to extract a trend;

means for transmitting, uplink from the mobile receiver and via the digital cellular radio system, the stored consecutive values, the extracted trend, a post-processed version of the stored consecutive values, or a post-processed version of the extracted trend to a quality control system of the digital cellular radio system.

14. The apparatus according to claim 13, wherein the means modified for combining the signal with the signal to create a noise estimation measure comprise a power meter for measuring average power content of the signal and the modified signal over at least one of a plurality of common ranges of their frequency spectra.

15. The apparatus according to claim 13 or 14, wherein the means for modifying the amplitude of the signal comprising the noise include means for attenuating the signal primarily outside the frequency range of the desired part of the signal.

16. The apparatus according to claim 14, wherein the means for combining the signal with the modified signal to create a noise estimation measure comprise means for computing a difference in average power content between the signal and the modified signal.

17. The apparatus according to claim 13 or 14, wherein the apparatus is adapted to handle digital signals.

18. The apparatus according to claim 17, wherein the means for attenuating the signal primarily outside the frequency range of the desired part of the signal comprise a digital filter.

19. A mobile telephone comprising:

means for estimating residual noise in a frequency range of a desired part of a signal received in the mobile telephone via a digital cellular radio system, the desired part of the received signal representing a selected channel of the digital cellular radio system wherein the amplitude of the received signal is modified, the received signal comprising the residual noise;

wherein the received signal is combined with the modified received signal to create a noise estimation measure;

means for estimating residual noise in the frequency range of the desired part of the received signal;

means for storing, evaluating, and transmitting, uplink from the mobile telephone and via the digital cellular radio system, at least one of resulting noise estimation measurements and post-processed versions of the resulting noise estimation measurements to a link quality control system of the digital cellular radio system.

20. The mobile telephone according to claim 19, wherein the mobile telephone is adapted to perform a noise estimation measurement during each of a plurality of basic time units of a channel of the digital cellular radio system.

* * * * *

UNITED STATES PATENT AND TRADEMARK OFFICE
CERTIFICATE OF CORRECTION

| | | |
|---|---|---|
| PATENT NO. | : 6,871,066 B1 | Page 1 of 1 |
| APPLICATION NO. | : 09/661677 | |
| DATED | : March 22, 2005 | |
| INVENTOR(S) | : Anders Khullar et al. | |

It is certified that error appears in the above-identified patent and that said Letters Patent is hereby corrected as shown below:

Column 1, line 49        Replace "ir"
                         With --if--

Signed and Sealed this

Fifteenth Day of August, 2006

JON W. DUDAS
*Director of the United States Patent and Trademark Office*